(12) United States Patent
Thomas

(10) Patent No.: US 9,832,923 B2
(45) Date of Patent: Dec. 5, 2017

(54) HYDROSEEDER WITH PIVOTING AUGER CONVEYOR

(71) Applicant: Double T Equipment Ltd., Airdrie (CA)

(72) Inventor: Thomas M. Thomas, Cochrane (CA)

(73) Assignee: Double T. Equipment Ltd., Alberta (CA)

( * ) Notice: Subject to any disclaimer, the term of this patent is extended or adjusted under 35 U.S.C. 154(b) by 141 days.

(21) Appl. No.: 14/709,557

(22) Filed: May 12, 2015

(65) Prior Publication Data

US 2016/0330900 A1 Nov. 17, 2016

(51) Int. Cl.
*A01C 7/00* (2006.01)
*A01C 15/00* (2006.01)

(52) U.S. Cl.
CPC ............ *A01C 7/004* (2013.01); *A01C 15/003* (2013.01)

(58) Field of Classification Search
CPC ......... A01C 7/004; A01C 7/06; A01C 15/003; B05B 7/26; B01F 13/0035; B01F 15/0251; E21B 43/267
USPC ........... 239/302, 345, 172, 146; 141/67, 231
See application file for complete search history.

(56) References Cited

U.S. PATENT DOCUMENTS

| 3,498,483 | A |   | 3/1970 | Meharry |            |
|-----------|---|---|--------|---------|------------|
| 3,920,184 | A | * | 11/1975 | Waldrum | A01C 7/004 |
|           |   |   |        |         | 111/900    |
| 4,037,745 | A | * | 7/1977 | Hengen  | A01D 41/1217 |
|           |   |   |        |         | 198/668    |
| 4,503,803 | A | * | 3/1985 | Barnes  | A01C 1/08  |
|           |   |   |        |         | 111/173    |
| 4,632,284 | A | * | 12/1986 | Erazo  | A01C 1/046 |
|           |   |   |        |         | 111/124    |
| 4,669,945 | A |   | 6/1987 | Pollard et al. | |
| 4,729,514 | A | * | 3/1988 | Ostrom  | A01C 7/004 |
|           |   |   |        |         | 111/130    |

(Continued)

FOREIGN PATENT DOCUMENTS

WO    WO 2008116521 A1 * 10/2008 ........... A01C 15/003

OTHER PUBLICATIONS

Machine Translation dated Jun. 9, 2017 of foreign refernece WO2008116521A1.*

*Primary Examiner* — Arthur O Hall
*Assistant Examiner* — Steven M Cernoch
(74) *Attorney, Agent, or Firm* — Norton Rose Fulbright Canda LLP; Paul J. Field

(57) ABSTRACT

A hydroseeder, for spraying a slurry mixture on a ground surface, the hydroseeder comprising: a liquid containment tank having an internal mixer, a tank inlet and a tank outlet, wherein the tank inlet is disposed above a maximum liquid fill level of the tank; a pump and a spray nozzle in communication with the tank outlet; a conveyor comprising an enclosed cantilever housing having an infeed chute at a lower end and a discharge spout at an upper end in communication with the tank inlet, the discharge spout of the enclosed cantilever housing pivotally supported on a slew ring to rotate about an axis of rotation relative to the tank inlet, the slew ring sealing between the discharge spout and the tank inlet during rotation between a stowed position and a deployed position; wherein the infeed chute in the deployed position is disposed at a loading height from the ground surface.

10 Claims, 11 Drawing Sheets

(56) References Cited

U.S. PATENT DOCUMENTS

| | | | | |
|---|---|---|---|---|
| 4,779,776 A * | 10/1988 | Erazo | ............... | A01C 1/046 111/917 |
| 4,895,106 A * | 1/1990 | Barnes | ............... | A01C 1/08 118/19 |
| 5,468,113 A * | 11/1995 | Davis | ............... | B65G 33/32 198/550.1 |
| 5,484,249 A * | 1/1996 | Klatt | ............... | B60P 1/40 414/332 |
| 5,582,221 A | 12/1996 | Smith et al. | | |
| 5,884,570 A * | 3/1999 | Lincoln | ............... | A01C 7/004 111/100 |
| 5,888,044 A | 3/1999 | Baskerville | | |
| 6,112,679 A * | 9/2000 | Borstmayer | ............... | A01C 7/004 111/173 |
| 7,150,413 B1 * | 12/2006 | Bricko | ............... | B05B 9/0403 239/147 |
| 7,267,519 B2 | 9/2007 | Cresswell et al. | | |
| 7,500,814 B2 | 3/2009 | Meyer | | |
| 7,913,931 B2 * | 3/2011 | Hollinrake | ............... | E01C 19/203 239/172 |
| 8,221,047 B2 | 7/2012 | Petersen et al. | | |
| 8,746,434 B2 * | 6/2014 | Neufeld | ............... | A01C 15/003 198/312 |
| 8,794,900 B2 | 8/2014 | Friggstad et al. | | |
| 8,801,353 B2 | 8/2014 | Friggstad et al. | | |
| 8,931,995 B2 | 1/2015 | Fitzgerald et al. | | |
| 2003/0168535 A1 * | 9/2003 | Hollinrake | ............... | E01C 19/203 239/672 |
| 2008/0257449 A1 | 10/2008 | Weistein et al. | | |
| 2010/0068021 A1 | 3/2010 | Petersen et al. | | |
| 2010/0175600 A1 * | 7/2010 | Cruson | ............... | A01C 5/062 111/149 |
| 2011/0146549 A1 * | 6/2011 | Anthony | ............... | A01C 7/06 111/174 |
| 2016/0029551 A1 * | 2/2016 | Crivello | ............... | A01C 7/06 239/10 |

* cited by examiner

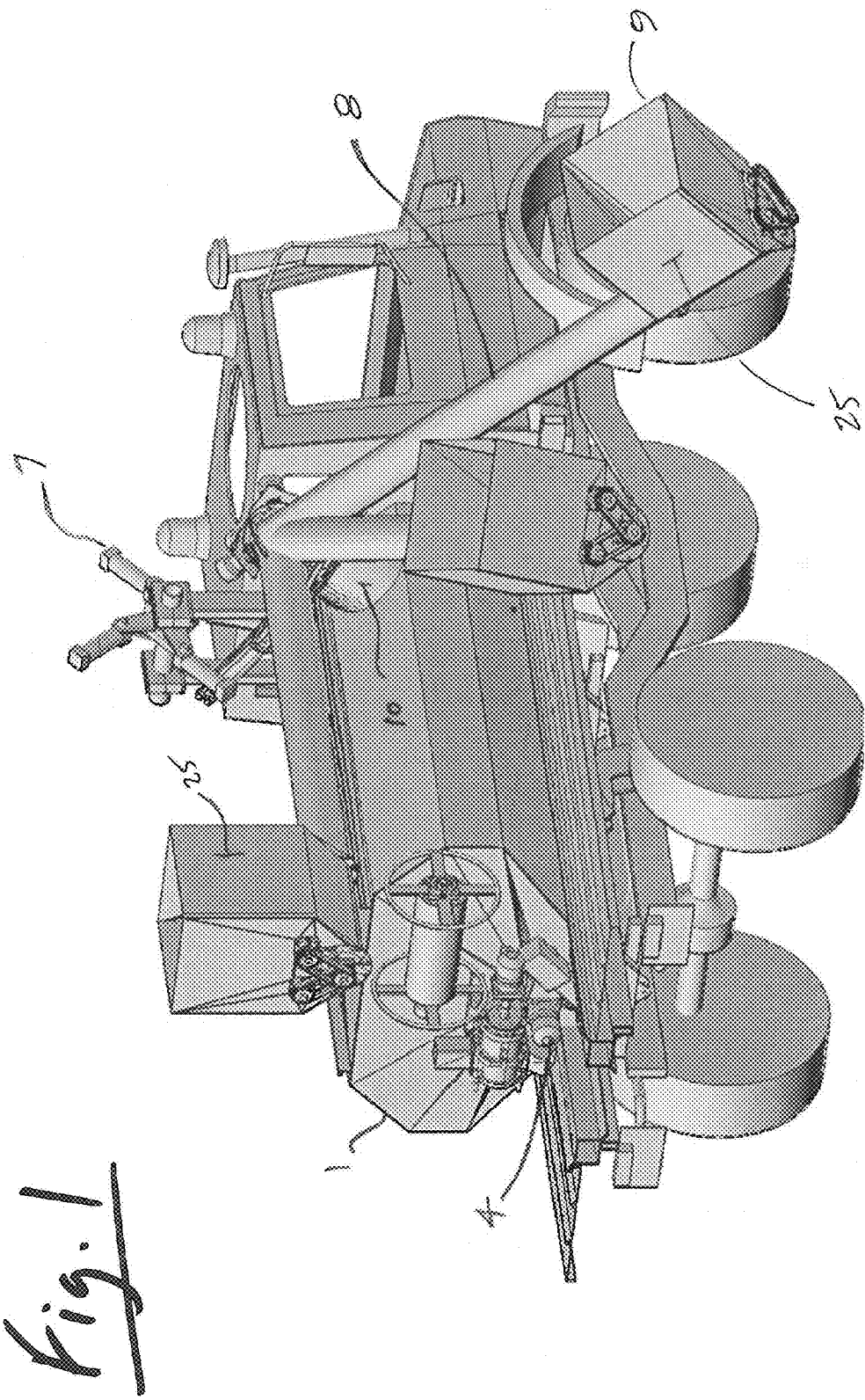

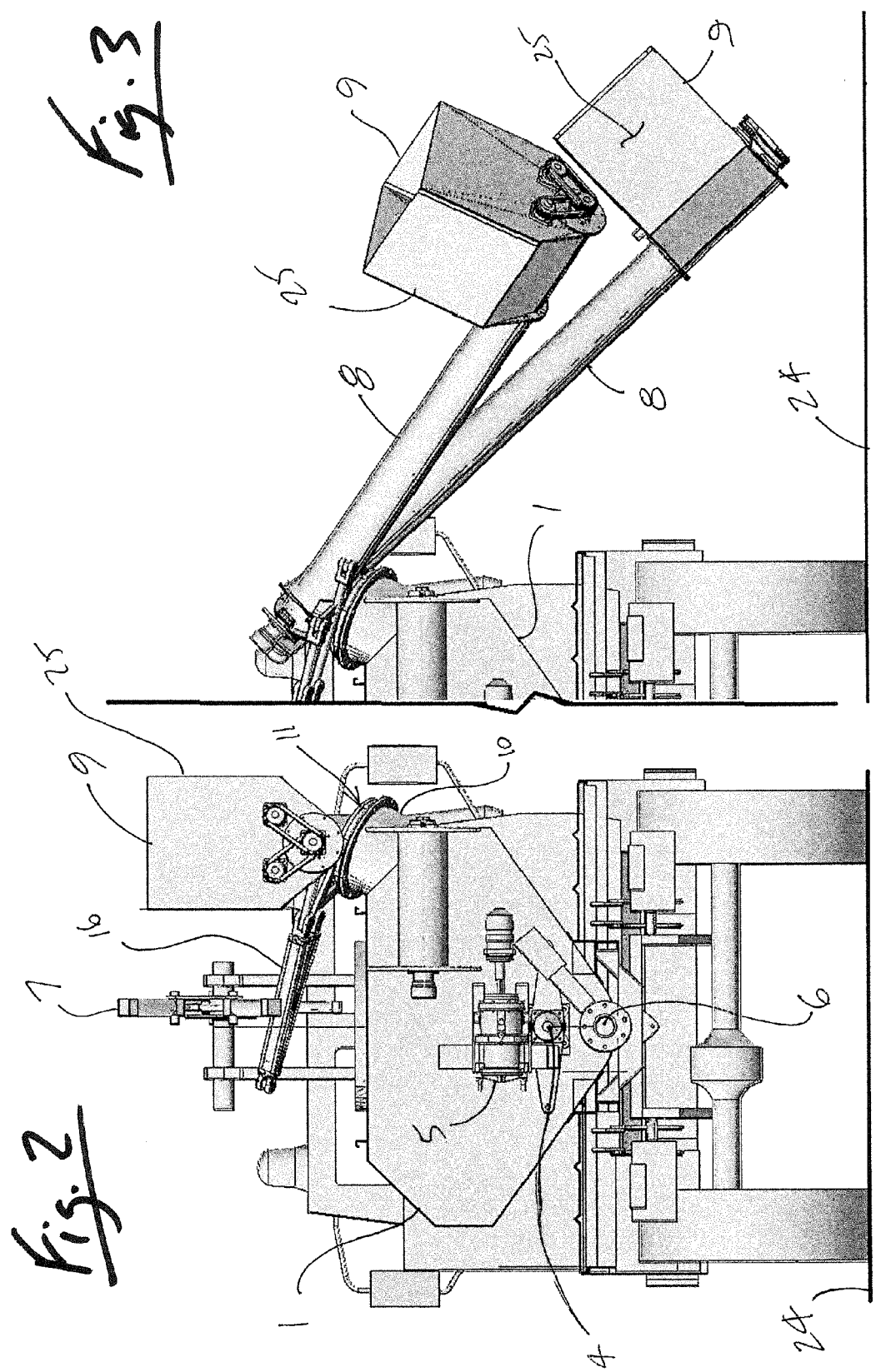

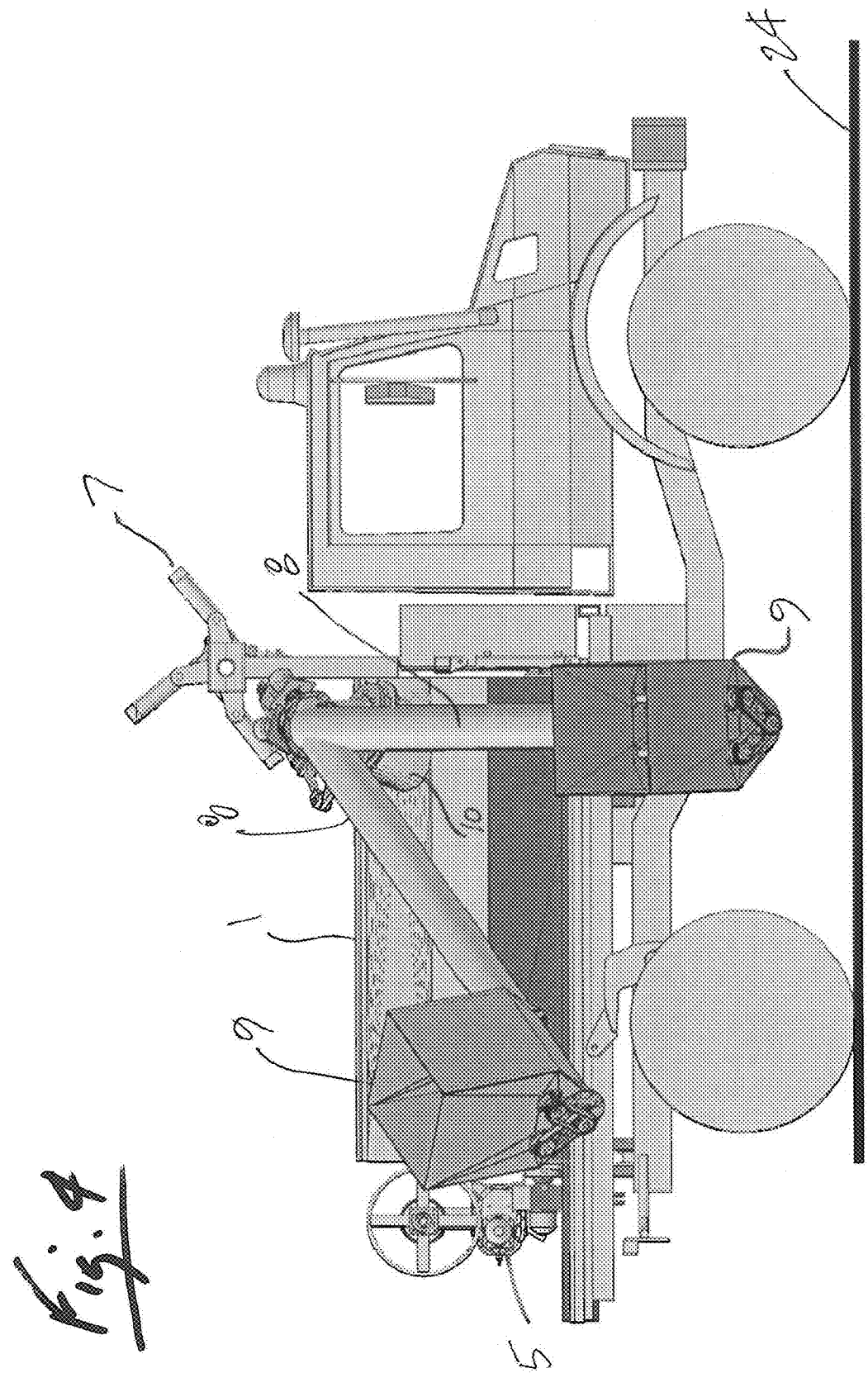

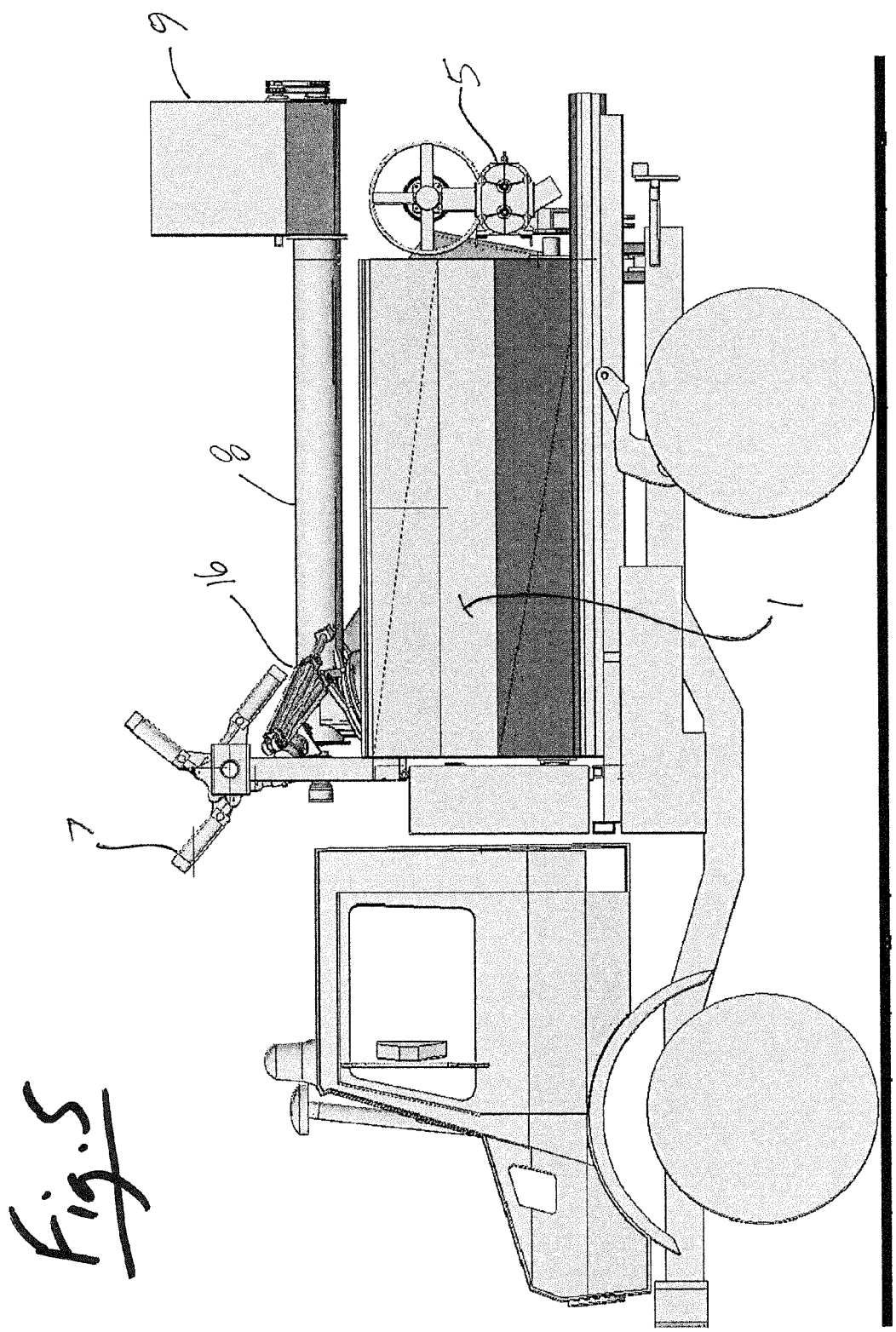

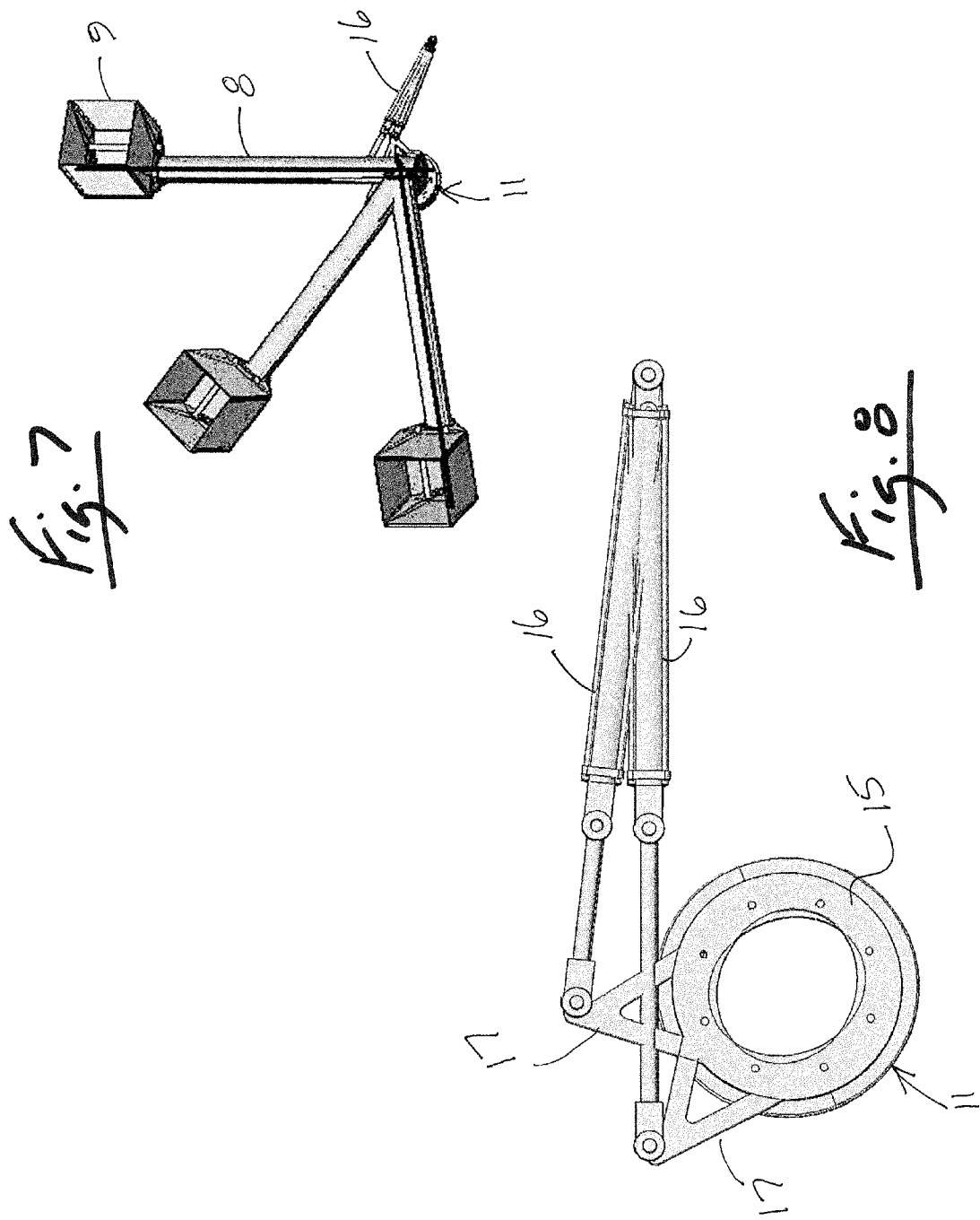

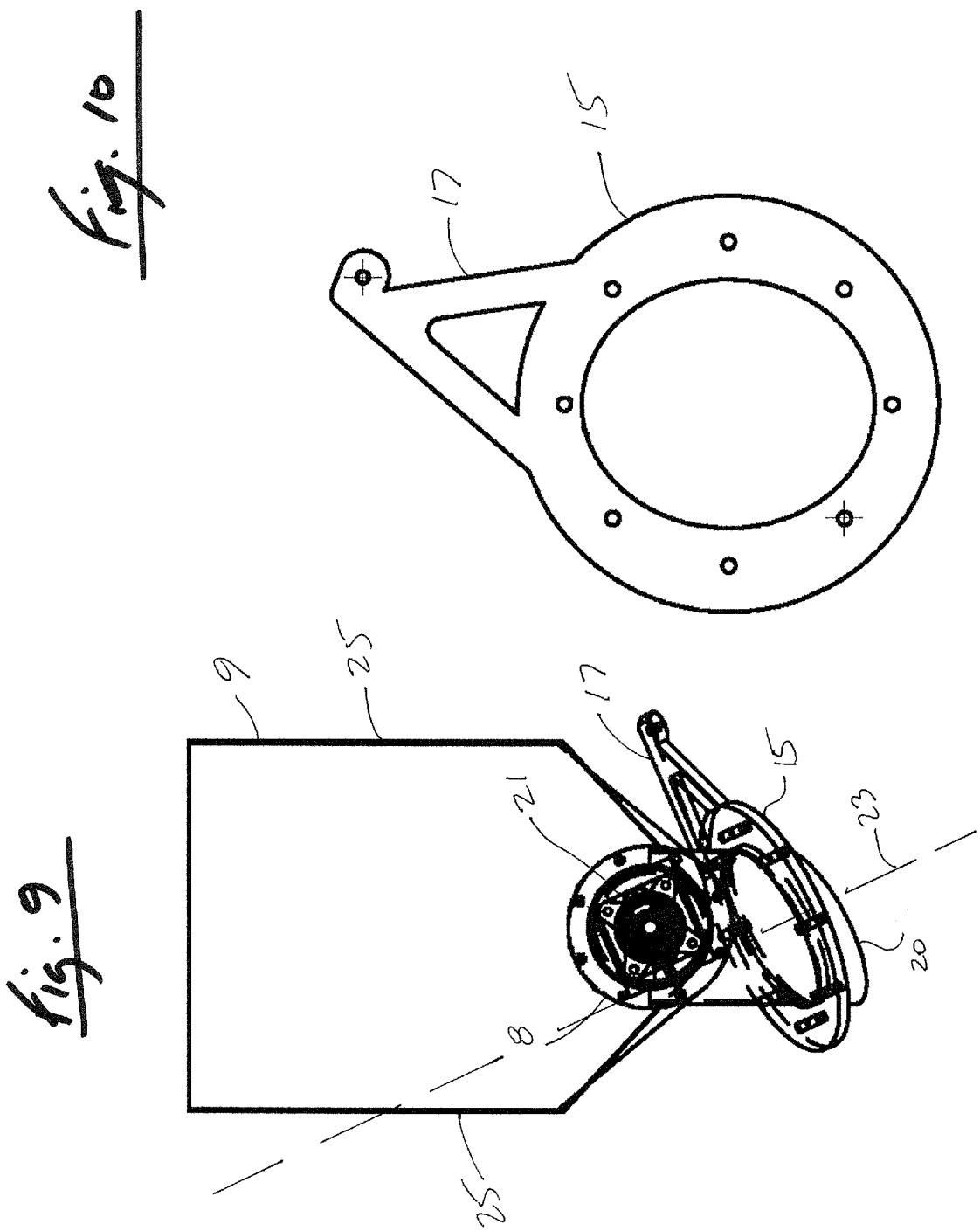

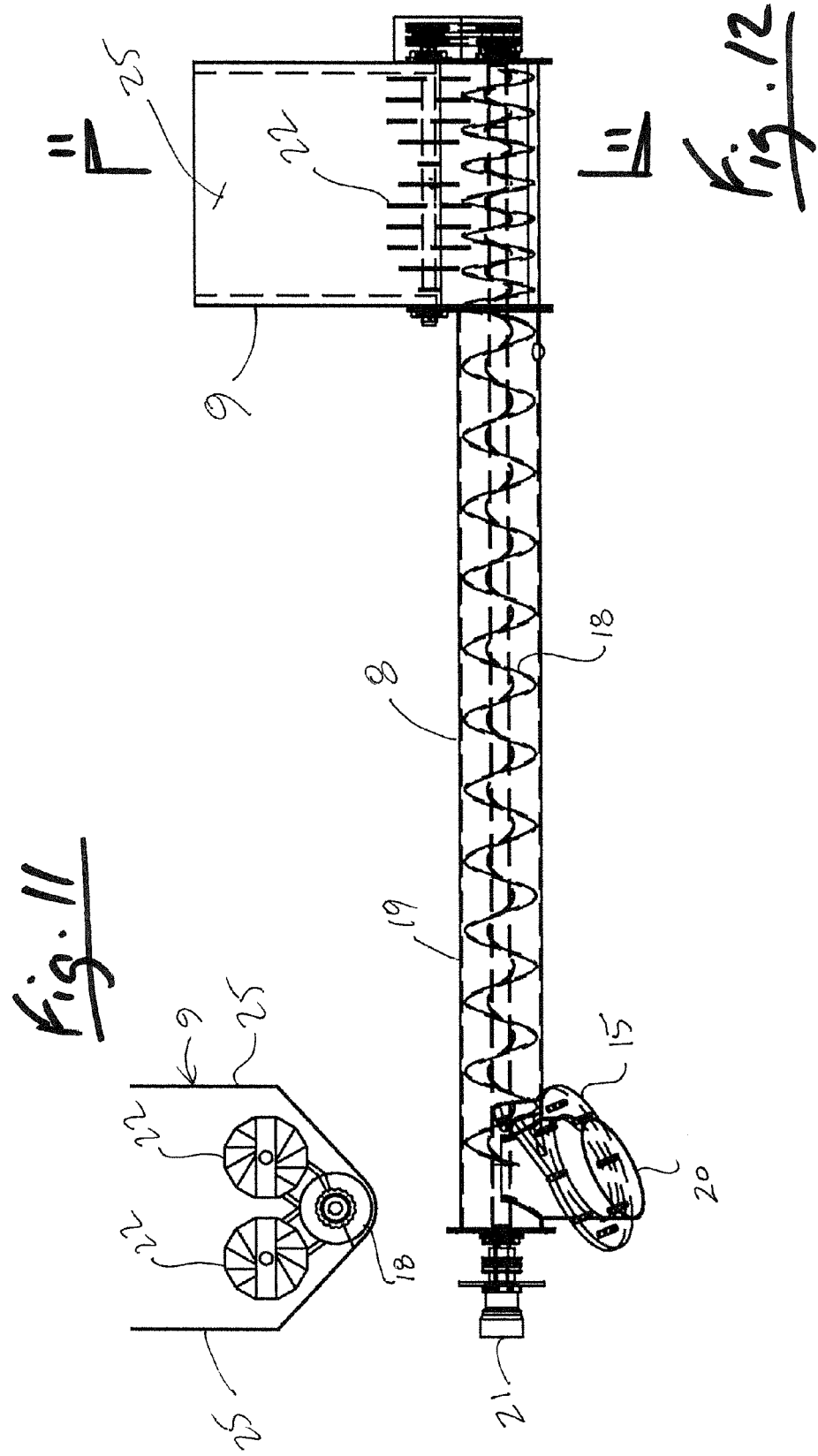

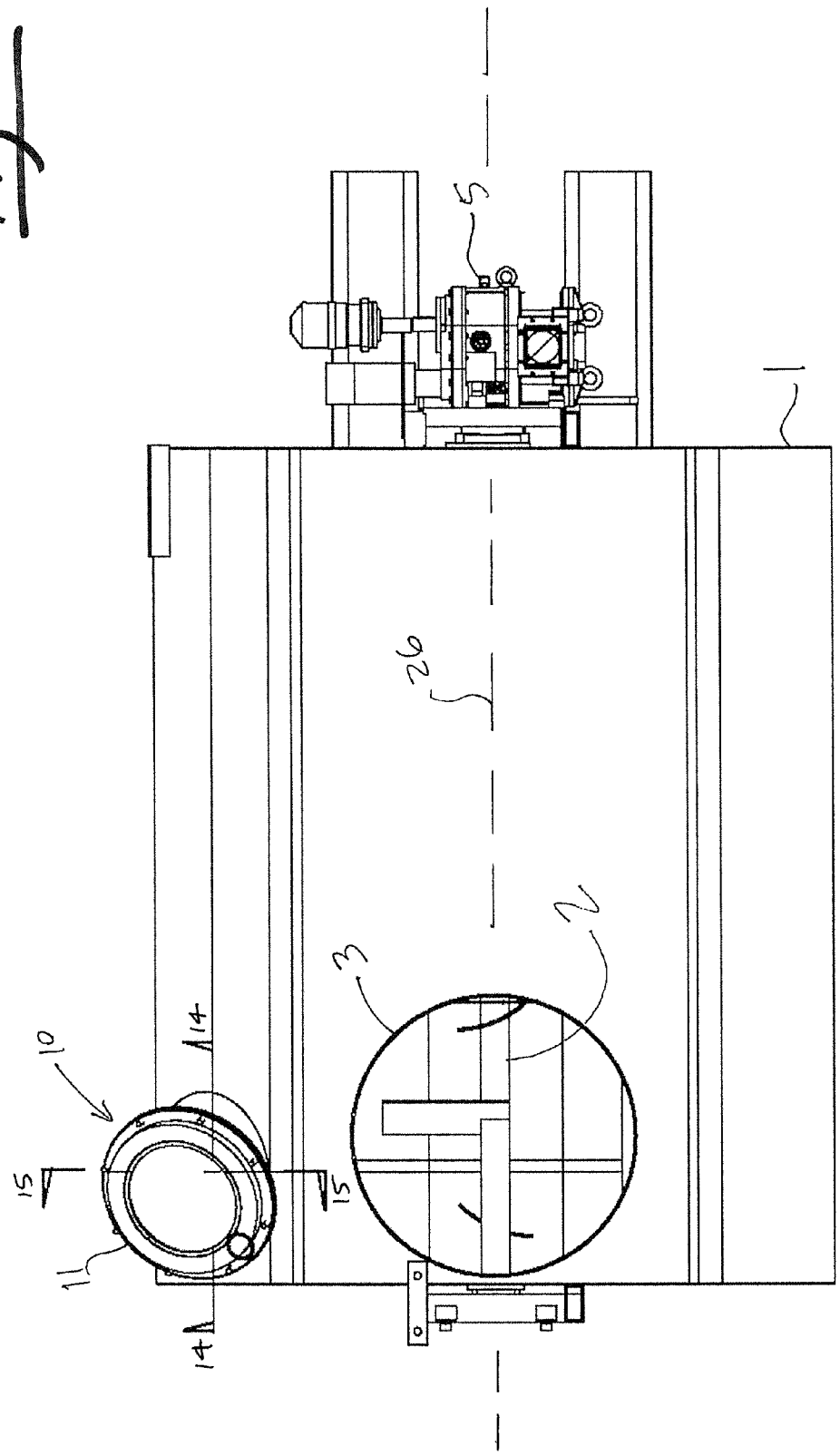

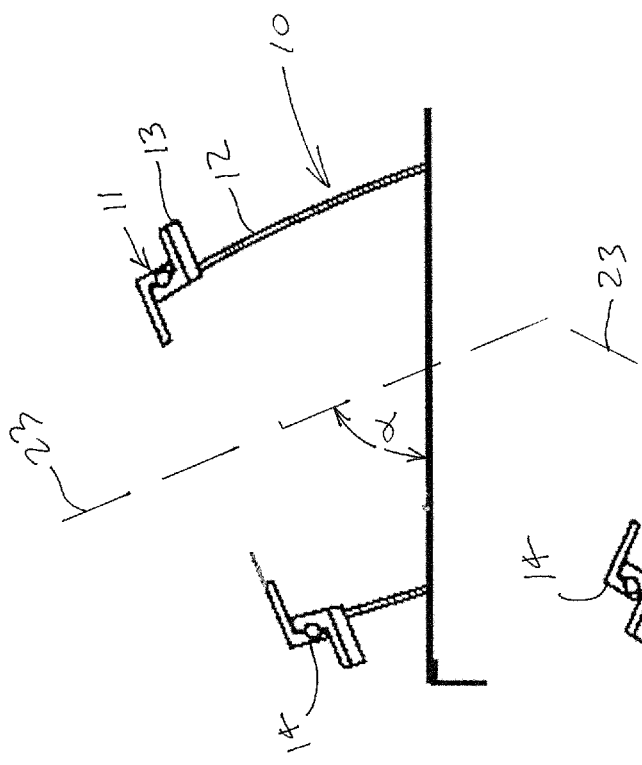
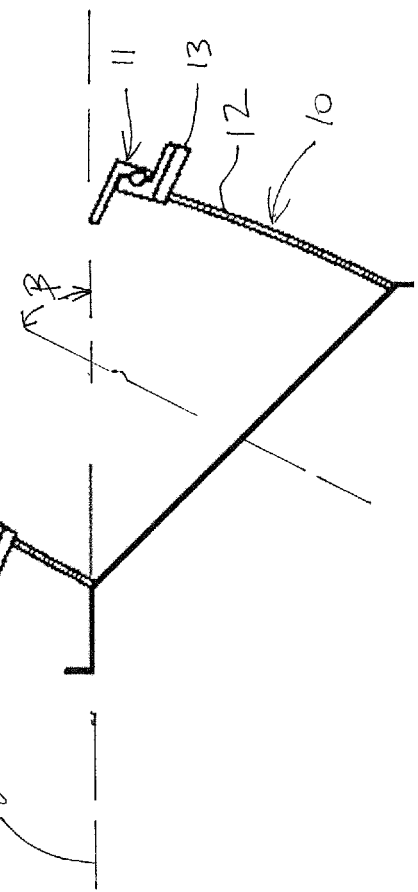

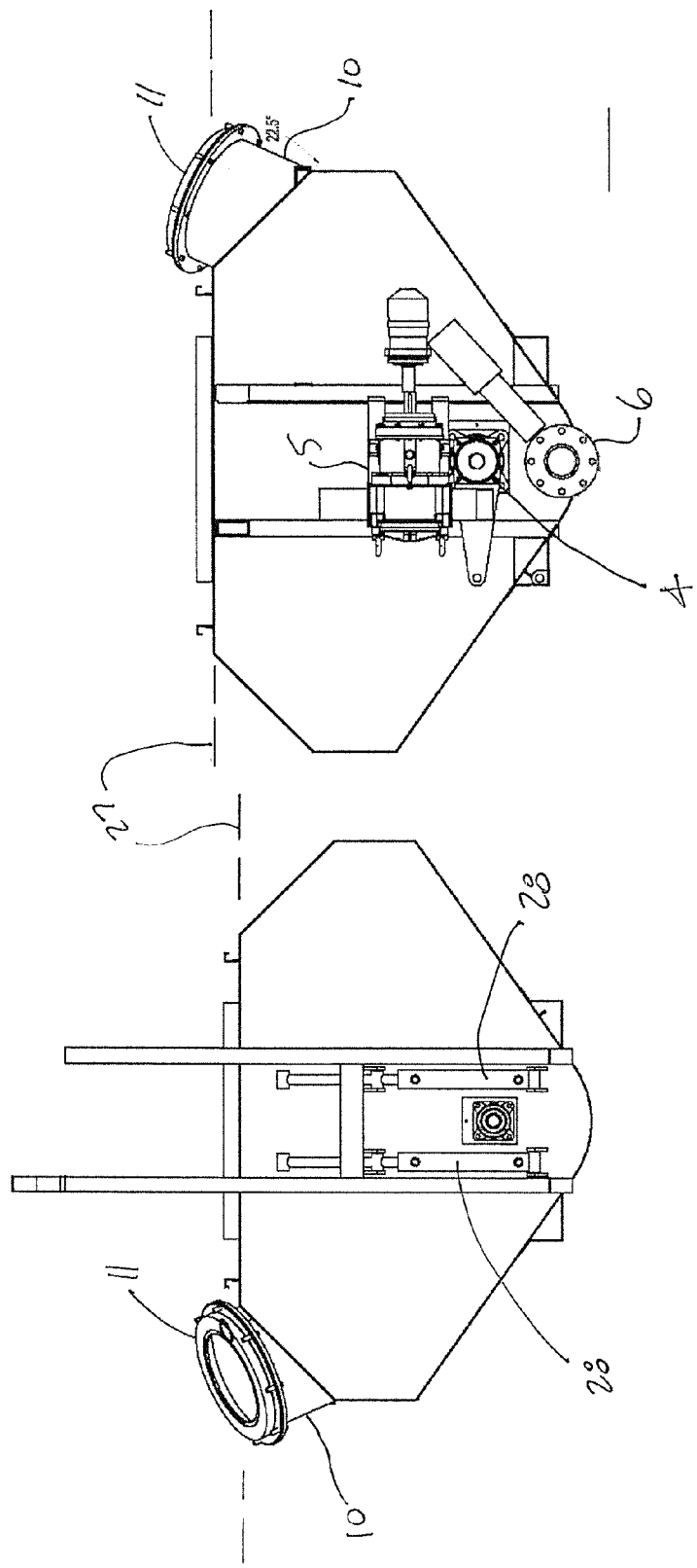

HYDROSEEDER WITH PIVOTING AUGER CONVEYOR

TECHNICAL FIELD

The invention relates to a hydroseeder having a mixing tank, pump and nozzle for spraying a slurry of water, seed and mulch on soil surfaces, where the mixing tank is loaded using a pivoting auger conveyor.

BACKGROUND OF THE ART

Hydroseeding is a process for planting seeds of grass or plants on a soil surface where a mixing tank, pump and nozzle are used to spray a slurry mixture of water, seed, mulch and a bio degradable adhesive type binder on the soil surface. The binder and mulch retain moisture, resist soil erosion and physically restrain the seeds from moving during germination and root growth. The binder and mulch eventually decay while the seed grows into rooted plants.

Conventional hydroseeders are often mounted to vehicles and include a mixing tank with a platform on the top surface of the tank. The platform provides the operator with access to a hatch into which water, bags of dry seed, mulch and binder are loaded into the tank. Tanks include paddle mixers or impellers to mix the ingredients into a slurry that is drawn from the tank through a pump, a hose and a spray nozzle.

The tank top platform is used by the operator as an elevated platform from which to hold the hose and nozzle at a height during spraying. The elevated height allows the operator to observe the spray operation but involves the risk of slipping and falling from a significant height. The platform may be slippery due to overspray of the liquid slurry, due to wind, rain and snow, and due to water and particulate matter spillage during loading of the tank.

The top platform is often used for storing the dry bags of seed, mulch and binder during transport to the site. Spillage of dry particulate material from the bags creates a slip and fall danger for the operator at an elevated height. Spillage of seeds, mulch and binder creates waste and increases cost.

Therefore the conventional hydroseeder equipment imposes significant safety risks to the operator including falls from a height, slipping on a wet platform surface, slipping on dry spilled particulate matter on the platform surface, and the risk of falling from the ladder used to access the elevated platform.

If the spray operator on the elevated platform chooses to spray while a driver moves the vehicle, an extremely unsafe condition arises, which likely violates various worker safety regulations but increases the speed of the spray operation. The spray operator may slip on the platform surface during vehicle movement. The spray operator may be knocked off balance by the movement of the vehicle or by the force of the pressurized liquid whipping the hose and nozzle. If a fall occurs, the driver may not notice because of limited visibility and because of the noise created by the pump and vehicle engine. Therefore worker training and supervision are necessary to avoid injuries and violations of worker safety regulations. However due to the nature of the hydroseeding work, operators may be working alone or in unpopulated areas where close supervision is impractical.

Material handling at a height involves risk of injury to the workers since bags of dry material are lifted to the elevated platform using forklifts or other equipment with imperfect visibility, and the bags are manually carried to the access hatch during loading of the mixing tank.

Conventional hydroseeder equipment with an elevated platform also requires inefficient and time consuming material handling of bags of dry particulate matter. The bags are lifted to the level of the elevated platform and the operator must work at a height to either store the bags on the platform during transport or immediately load the bagged material into the access hatch of the mixing tank. In any case the operator must climb a ladder to the elevated platform, work at an elevated height to handle the bags of materials and then climb down the ladder from the platform to drive in the vehicle, all of which consumes time and involves safety risk due to the platform height.

Features that distinguish the present invention from the background art will be apparent from review of the disclosure, drawings and description of the invention presented below.

DISCLOSURE OF THE INVENTION

The invention provides a hydroseeder, for spraying a slurry mixture on a ground surface, the hydroseeder comprising: a liquid containment tank having an internal mixer, a tank inlet and a tank outlet, wherein the tank inlet is disposed above a maximum liquid fill level of the tank; a pump and a spray nozzle in communication with the tank outlet; a conveyor comprising an enclosed cantilever housing having an infeed chute at a lower end and a discharge spout at an upper end in communication with the tank inlet, the discharge spout of the enclosed cantilever housing pivotally supported on a slew ring to rotate about an axis of rotation relative to the tank inlet, the slew ring sealing between the discharge spout and the tank inlet during rotation between a stowed position and a deployed position; wherein the infeed chute in the deployed position is disposed at a loading height from the ground surface.

DESCRIPTION OF THE DRAWINGS

In order that the invention may be readily understood, one embodiment of the invention is illustrated by way of example in the accompanying drawings.

FIG. 1 is a rear-right isometric view of a hydroseeder with a mixing tank mounted on the chassis of a vehicle, where the pivotally mounted cantilever conveyor is shown in three positions, namely: stowed position (upper left); deployed position (lower right); and an intermediate position.

FIG. 2 is a rear elevation view of the vehicle and hydroseeder with the pivotally mounted cantilever conveyor in the stowed position.

FIG. 3 is a partial rear elevation view of the vehicle and hydroseeder with the pivotally mounted cantilever conveyor in the deployed position and in the intermediate position.

FIG. 4 is a right side elevation view of the vehicle and hydroseeder with the pivotally mounted cantilever conveyor in the deployed position and in the intermediate position.

FIG. 5 is a left side elevation view of the vehicle and hydroseeder with the pivotally mounted cantilever conveyor in the stowed position.

FIG. 7 is a top isometric detail view of the pivotally mounted conveyor housing with infeed chute and rotary actuating hydraulic cylinder.

FIG. 8 is a detail view of the slew ring, crank arm and rotary actuating hydraulic cylinder.

FIG. 9 is a front elevation or axial view of the auger conveyor housing, slew ring and infeed chute.

FIG. 10 is a detail view of the housing flange with the rotary crank arm.

FIG. 11 is a section view along line 11-11 of FIG. 12.

FIG. 12 is a left side elevation view of the auger conveyor housing, slew ring and infeed chute.

FIG. 13 is a top plan view of the mixing tank with tank inlet (top left) and tank outlet (center right) to the pump.

FIGS. 14 and 15 are sectional views through the tank inlet and slew ring along lines 14-14 and 15-15 of FIG. 13.

FIG. 16 is a front elevation view of the tank with tilt lifting hydraulic cylinders.

FIG. 17 is a rear elevation view of the tank with tank outlet and pump.

Figure 6:
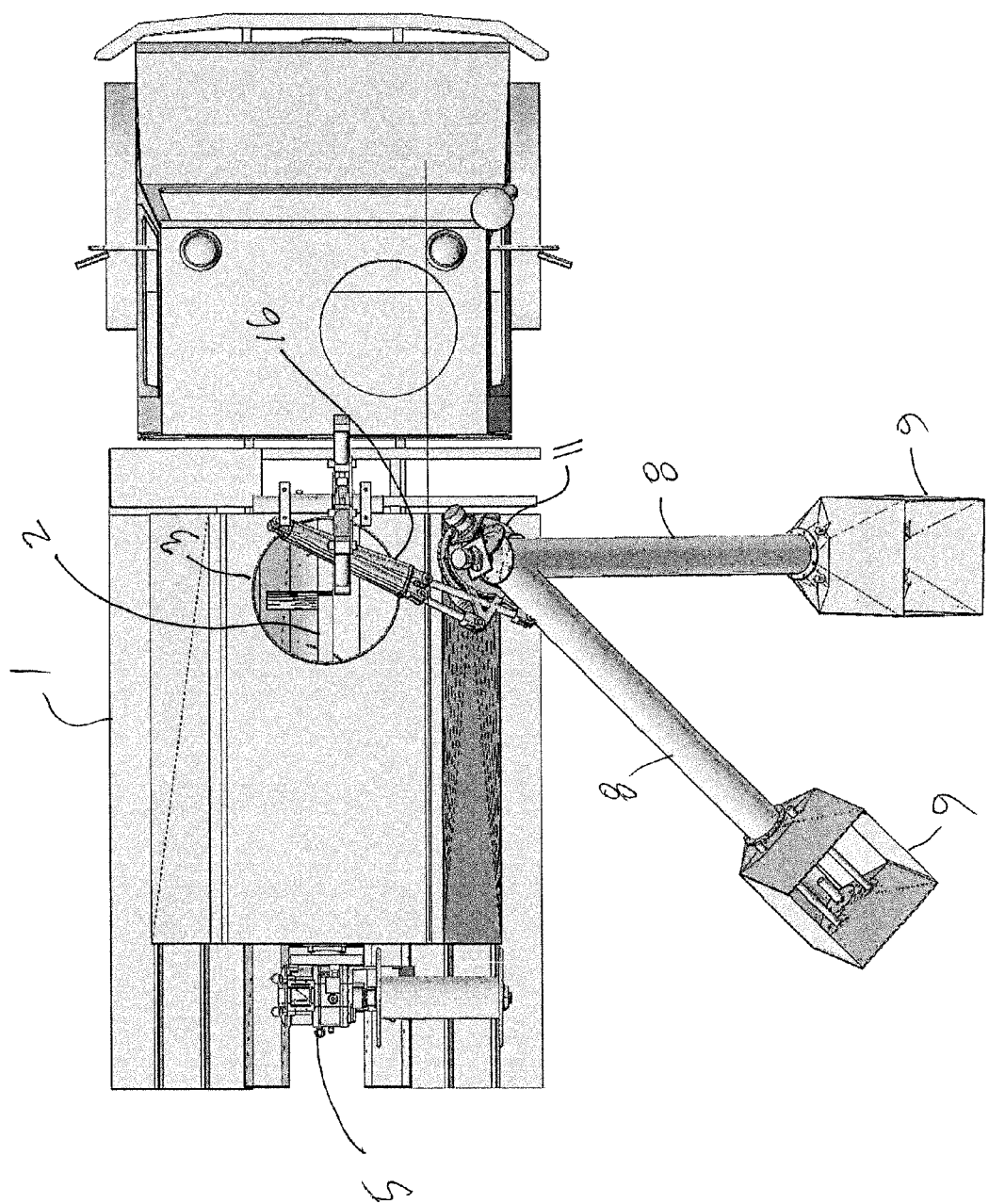
FIG. 6 is a top plan view of the vehicle and hydroseeder with the pivotally mounted conveyor in the deployed position and in the intermediate position.

Further details of the invention and its advantages will be apparent from the detailed description included below.

DETAILED DESCRIPTION OF PREFERRED EMBODIMENTS

FIGS. 1 to 6 show various views of an example where the hydroseeder is mounted to a structural subframe hinged to the chassis beams of an automotive vehicle for spraying a slurry mixture of seed, mulch, binder and water on a ground surface. The vehicle has an engine that includes a power take-off shaft that can be used for driving a hydraulic pump and powering the hydraulic circuit. The hydroseeder can also be constructed with an independent engine or electric motor to power the hydraulic circuit. Various hydraulic cylinders and hydraulic motors can be operated using the hydraulic fluid power generated to rotate and actuate parts of the hydroseeder such as an internal mixer in the tank, slewing of the auger conveyor, deployment of the spray nozzle, driving of the water pump and tilting of the tank for drainage and cleaning.

The vehicle illustrated is a four-wheel drive truck having the advantage of being relatively small, maneuverable and lightweight for access over steep slopes, soft ground and unpaved surfaces. It will be understood that the invention is scalable to any size and equally applicable to mounting on large trucks, track driven vehicles, tow trailers or railway vehicles.

Best seen in FIGS. 6 and 13, the hydroseeder includes an elongate liquid containment tank 1 having an internal mixer 2 with an axial shaft visible through the open access hatch 3 in the tank top. The shaft of the internal mixer 2 is rotated with a hydraulic mixing motor 4 as shown in FIGS. 1 and 2.

Water can be loaded into the tank 1 through relatively small conduits or openings since water under pressure is often available on a construction site. Best seen in FIG. 5, the hydroseeder has a lobe pump 5 for pressurizing the slurry drawn from the tank outlet 6 (see FIG. 1) and spraying the slurry through a nozzle assembly 7. The tank 1 can also be filled from standing water in ponds or rivers by reversing the lobe pump 5 to draw water into the tank 1 through the outlet 6. Explanation of the details of the nozzle assembly 7, lobe pump 5 and slurry conduits is unnecessary herein since these features are commonly known.

The tank inlet 10 for loading dry particulate matter (i.e. seed, mulch and binder) is obscured in FIGS. 1-6 because the (screw auger) conveyor 8 and infeed chute 9 are pivotally supported in a cantilever manner on the tank inlet 10, that will described in detail below.

FIGS. 13-17 better illustrate the structure of the tank inlet 10 and slew ring 11. The tank inlet 10 has a short hollow pipe section 12 that provides access to the tank interior above a maximum liquid fill level of the tank. The slew ring 11 pivotally supports the conveyor 8 and includes the tank inlet flange 13, a rotary ring bearing 14, the conveyor housing flange 15 (see FIG. 12) and a rotary actuator (see FIG. 8). The rotary actuator to rotate the conveyor 8 in the illustrated embodiment comprises the hydraulic cylinder 16 and crank arm 17 of the conveyor housing flange 15. Alternative rotary actuators include a ring gear on the conveyor flange, driven by a spur gear or a worm gear and hydraulic or electric rotary motor, for example.

FIGS. 9-12 best show the structure of the conveyor 8 and infeed chute 9. The conveyor 8 in the example shown has an auger screw 18 rotatably mounted on bearings at both ends to turn within an enclosed cantilever tubular housing 19. The housing 19 includes the infeed chute 9 at a lower end and a lateral discharge spout 20 at an upper end. The screw auger 18 is rotated by a hydraulic motor 21 (FIG. 12). Two shredders 22 are provided in the infeed chute 9 comprising a shaft with blades that are rotated by sprockets and chains driven by the screw auger 18 at the bottom end of the conveyor 8. Bags containing dry particulate matter are cut open and the contents dropped into the infeed chute 9. The fibers and particles of moist fibrous mulch in particular may become compacted or agglomerated during shipping and storage. To be conveyed by the auger screw 18 the shredders 22 break up the lumps of mulch and any other materials fed into the infeed chute 9 that become compacted or bonded together. The particles of seed, mulch and binder are conveyed upward through the housing 19 by the rotation of the screw auger 18. At the upper end of the housing 19, the auger screw 18 conveys dry material into the lateral discharge spout 20.

The lateral discharge spout 20 is rotatably mounted to the tank inlet 10 on the slew ring 11 and dumps the dry particulate matter into the tank. The slew ring 11 surrounds the periphery of the lateral discharge spout 20 that extends through the center of the slew ring 11. As seen in FIGS. 1-6, the discharge spout 20 of the enclosed cantilever housing 19 of the conveyor 8 is pivotally supported on the slew ring 11 alone to rotate about an axis of rotation 23 relative to the tank inlet 10. No other support is provided for the conveyor housing 19 apart from the slew ring 11 and the tubular housing 19 has sufficient strength to eliminate the need for intermediate supports or cables.

The slew ring 11 seals between the discharge spout 20 and the tank inlet 10 during rotation between a stowed position and a deployed position. Dry particulate matter and dust cannot escape due to the enclosed conveyor 8 and spout 20 configuration that conveys material without exposure to weather or risk of spillage between the infeed chute 9 and the interior of the tank 1. The tank inlet 10 also includes a water spray nozzle that wets the dry particulate matter as it enters the tank 1 and wets any dry material floating on top of the water in the tank 1. The water spray nozzle at the tank inlet 10 aids in incorporating the floating dry materials into the water during filling and mixing in the tank 1.

As seen in FIGS. 1, 3, 4 and 6 the infeed chute 9 in the deployed position is disposed at a loading height from the ground surface 24. The infeed chute 9 in the stowed position, shown in FIGS. 1, 2, and 5, is rotated to a stowed height above the loading height. In the preferred example shown, the enclosed cantilever housing 19 in the stowed position is disposed above the tank inlet 10 and locked laterally above the tank 1 in a saddle support bracket during relocation of the hydroseeder and vehicle.

The selection of the axis of rotation 23 for the conveyor 8 depends on many factors, including the height and shape of the tank 1, the length of the conveyor 8, the desired angle at which the conveyor 8 is deployed and the location of the tank inlet 10, among others. However an important feature is the prevention of spillage from the infeed chute 9 during rotation of the conveyor 8 between the deployed position and the stowed position. Spillage of seed, mulch and binder not only represents a waste of valuable materials, but would require time consuming clean up of the spill by operators.

The infeed chute 9 at the lower end of the enclosed cantilever conveyor housing 19 has lateral walls 25 defining an upward loading opening. As seen in FIGS. 1-7 the axis of rotation 23 is selected, by definition perpendicular to the plane of the slew ring, by trial and error. For example, the axis of rotation 23 may be selected to orient the lateral walls 25 upwardly (i.e. substantially in a vertical plane) during rotation between the stowed position and the deployed position. Modern design and fabricating shops use CAD/CAM programs extensively (computer aided design/computer aided manufacturing). Therefore although trial and error implies some inefficiency, by using CAD/CAM a designer can quickly determine the angle of rotation 23 by modeling the desired configuration of conveyor 8 in the desired stowed position, the desired deployed position and through iterative trial and error, approach the ideal required axis of rotation 23. Use of complex mathematics or manual graphic solutions by the designer are not required and not particularly efficient when compared to trial and error using commonly available CAD/CAM computer programs like AutoCAD™ or DraftSight™.

Referring to FIGS. 13-15, the tank 1 has a longitudinal axis 26 and a reference plane 27 which in the example illustrated is the tank top surface. The axis of rotation 23 can be defined by: a center point of the tank opening; a first angle $\alpha$ relative to the longitudinal axis; and a second angle $\beta$ relative to the reference plane 27. Other coordinate methods or geometric definitions of the axis of rotation 23 may be derived that are equally suitable.

The complete drainage and cleaning of the tank interior is desirable to optimize use of water and dry materials, to purge the tank 1 between different uses, and to prevent mold or algae growth when not is constant use. To this end, the tank 1 is constructed on a subframe that is mounted on hinges to the vehicle chassis to tip the tank 1 towards the outlet 6 disposed at a bottom end of the tank 1 and at the rear of the vehicle. FIG. 16 shows two parallel hydraulic tipping cylinders 28 for lifting and tipping the tank 1 between a level lowered position and a tipped draining position wherein the front of the tank is raised.

Although the above description relates to a specific preferred embodiment as presently contemplated by the inventor, it will be understood that the invention in its broad aspect includes mechanical and functional equivalents of the elements described herein.

I claim:

1. A hydroseeder, for spraying a slurry mixture on a ground surface, the hydroseeder comprising:
   a liquid containment tank having an internal mixer, a tank inlet and a tank outlet, wherein the tank inlet is disposed above a maximum liquid fill level of the tank;
   a pump and a spray nozzle in communication with the tank outlet;
   a conveyor comprising an enclosed cantilever housing having an infeed chute at a lower end and a discharge spout at an upper end in communication with the tank inlet, the discharge spout of the enclosed cantilever housing pivotally supported on a slew ring to rotate about an axis of rotation relative to the tank inlet, the slew ring sealing between the discharge spout and the tank inlet during rotation between a stowed position and a deployed position;
   wherein the infeed chute in the deployed position is disposed at a loading height from the ground surface; and
   wherein the infeed chute and the enclosed cantilever housing of the conveyor in the stowed position are disposed above the tank inlet, and
   wherein the slew ring comprises a tank inlet flange; a housing flange; and a rotary ring bearing therebetween, and the slew ring includes a rotary actuator engaging the pivotally supported housing and engaging the tank.

2. The hydroseeder in accordance with claim 1, wherein the conveyor comprises an auger screw rotatably mounted within the enclosed cantilever housing, the enclosed cantilever housing comprising an elongate auger tube in communication with a lateral discharge spout.

3. The hydroseeder in accordance with claim 2, wherein the lateral discharge spout is pivotally supported on the slew ring to the tank inlet.

4. The hydroseeder in accordance with claim 1, wherein the rotary actuator engages the housing flange.

5. The hydroseeder in accordance with claim 4, wherein the rotary actuator comprises a hydraulic cylinder having a distal end pivotally mounted to a crank arm on the housing flange.

6. The hydroseeder in accordance with claim 1, wherein the infeed chute at the lower end of the enclosed cantilever housing comprises lateral walls defining an upward loading opening, and wherein the axis of rotation is selected to orient the lateral walls upwardly during rotation between the stowed position and the deployed position.

7. The hydroseeder in accordance with claim 1, wherein the tank has a longitudinal axis and a reference plane, and wherein the axis of rotation is defined by: a center point of the tank opening; a first angle relative to the longitudinal axis; and a second angle relative to the reference plane.

8. The hydroseeder in accordance with claim 1, wherein the tank is hinged to a vehicle for tipping between a lowered position and a tipped position wherein the tank outlet is disposed at a bottom end of the tank.

9. The hydroseeder in accordance with claim 1, wherein the infeed chute includes a shredder comprising at least one shaft with blades driven to rotate when the conveyor is operated.

10. The hydroseeder in accordance with claim 1, including a water spray nozzle in the tank intake.

* * * * *